J. KING.
WRENCH.
APPLICATION FILED APR. 7, 1908.
911,048.
Patented Feb. 2, 1909.
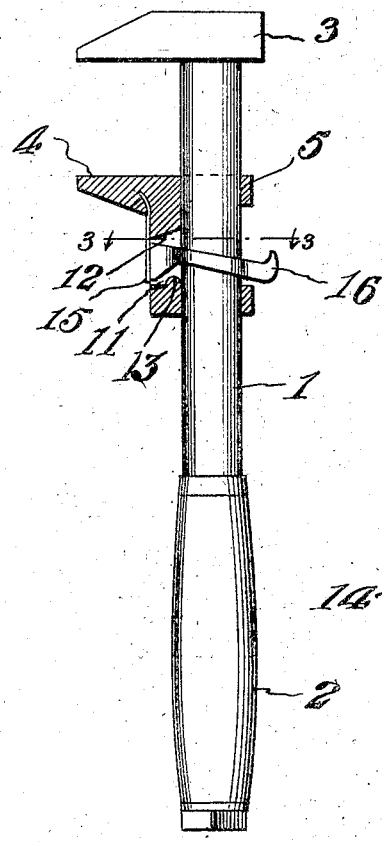
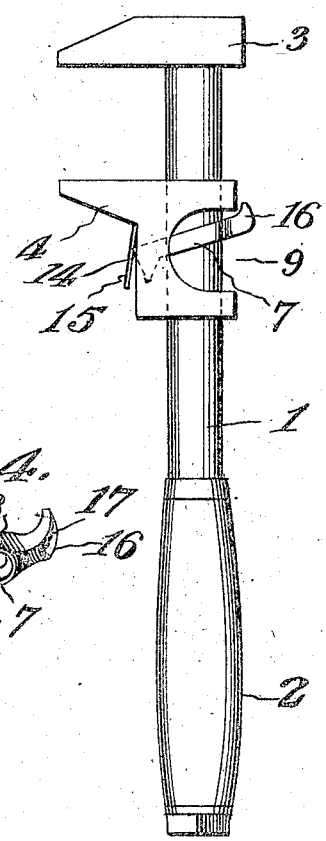
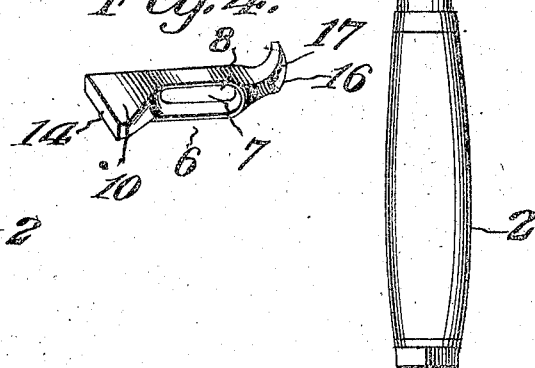
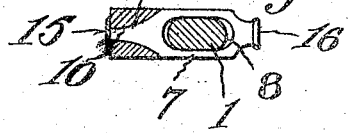
Witnesses:
Joe. P. Wahler,
John F. Byrne
Jacob King, Inventor,
By Victor J. Evans,
Attorney.

UNITED STATES PATENT OFFICE.

JACOB KING, OF CORINTH, MISSISSIPPI.

WRENCH.

No. 911,048.  Specification of Letters Patent.  Patented Feb. 2, 1909.

Application filed April 7, 1908. Serial No. 425,776.

*To all whom it may concern:*

Be it known that I, JACOB KING, a citizen of the United States of America, residing at Corinth, in the county of Alcorn and State of Mississippi, have invented new and useful Improvements in Wrenches, of which the following is a specification.

My invention relates to improvements in wrenches, and its primary object is the provision of a device of this character wherein the dog for locking the movable jaw in adjusted position can be readily and quickly moved into and held in inactive position, whereby to facilitate the adjustment of the jaw, said dog being also capable of being readily and quickly moved into and held in active position.

A further object of my invention is the provision of a wrench which is simple, durable and efficient, and which can be manufactured and sold at a comparatively low cost.

With the above and other objects in view, the invention consists in the construction, combination and arrangement of parts hereinafter fully described, claimed and illustrated in the accompanying drawing, wherein:

Figure 1 is a view in side elevation of a wrench constructed in accordance with my invention, the movable jaw being in section. Fig. 2 is a similar view, the movable jaw being shown in its entirety. Fig. 3 is a sectional view taken on a plane indicated by the line 3—3 of Fig. 1, and Fig. 4 is a detail perspective view of the locking dog.

Referring to the drawing by reference numerals, 1 designates the shank, 2 the handle, 3 the stationary, and 4 the movable jaw of a wrench constructed in accordance with my invention. The movable jaw is mounted upon the shank 1 for adjustment with relation to the stationary jaw 3, and is provided with a longitudinally extending opening 5 for the reception of the shank. The movable jaw is adapted to be held or locked in its adjusted position by means of a dog 6, which is shown in detail in Fig. 4 of the drawing. The locking dog 6 comprises a body 7 provided with an elongated opening 8 for the reception of the shank 1. The jaw 4 is cut away, as at 9, Fig. 2 of the drawing, for the reception of the body of the dog 6. The body of the locking dog 6 is extended in one direction to provide a fulcrum head 10 which is mounted in a socket 11 formed in the jaw 4, see Figs. 1 and 3 of the drawing. The fulcrum head 10 projects laterally in one direction beyond the plane of the body 7 of the locking dog, whereby to provide a substantially triangular fulcrum head. The end wall 12 of the socket 11 is inclined laterally and inwardly to permit the locking dog 6 to be moved upon the fulcrum head 10. The other end wall of the socket 11 is provided with a lug or projection 13 which is designed to prevent the head from becoming accidentally displaced when the locking dog is applied to the movable jaw prior to the application of the latter to the shank 1.

The manner in which the fulcrum head can be inserted in the socket 11 should be apparent. The outer edge 14 of the fulcrum head 10 is inclined slightly with relation to the longitudinal center of the locking dog, whereby the locking dog may be held in its inactive position by means of a leaf spring 15 which is adapted to bear upon the outer edge 14, and which is secured at one end to the movable jaw 4. The spring 15 is also adapted to hold the locking dog in its active position, the manner in which this is accomplished being fully illustrated in Fig. 2 of the drawing.

The body 7 of the locking dog is continued in one direction to provide an operating head 16 which projects laterally beyond the movable jaw 4. The end walls of the opening 8 are arranged in parallel but inclined planes, whereby when the locking dog is in active position, the opposite edges of the said walls will impinge against the shank 1 and lock the jaw in its adjusted position, and when the dog is in inactive position, the ends walls are spaced from the shank to permit the jaw to be freely adjusted thereon. The locking dog is adapted to be readily and quickly moved into its active or inactive position through the medium of the operating head 16, which is grooved as at 17, to receive the thumb of the user of the wrench.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

1. A wrench comprising a shank, a stationary jaw secured thereto, a movable jaw mounted thereon, a locking dog pivotally mounted upon the movable jaw and provided with an opening adapted to receive the shank, said dog being projected in one direction to form a fulcrum head and in the reverse direction to form an operating head, and a spring secured to the movable jaw, said spring being adapted to engage the fulcrum head to hold the locking dog in either its active or inactive position.

2. A wrench comprising a shank, a stationary jaw secured to the shank, a movable jaw mounted on the shank, a locking dog pivotally mounted in the movable jaw and provided with an opening adapted to receive the shank, said dog being projected in one direction to form a fulcrum head, and a spring secured to the movable jaw, said spring being adapted to engage the fulcrum head to hold the locking dog in either its active or inactive position.

3. A wrench comprising a shank, a stationary jaw secured to the shank, a movable jaw mounted on the shank and provided with a socket, one end wall of said socket being provided with a lug, a locking dog provided with an opening adapted to receive the shank, said dog being projected in one direction to form a fulcrum head adapted to be received by the socket in the movable jaw, said lug being adapted to prevent the accidental displacement of the dog, and a spring adapted to hold the locking dog in either its active or inactive position.

4. A wrench comprising a shank, a stationary jaw secured to the shank, a movable jaw mounted upon the shank, a locking dog pivotally mounted in the movable jaw, said locking dog being projected in one direction to provide a fulcrum head having its outer edge inclined with relation to the longitudinal plane of the locking dog, and a spring secured to the movable jaw, said spring being adapted to engage the inclined edge of the locking dog to hold the dog in either its active or inactive position.

In testimony whereof I affix my signature in presence of two witnesses.

JACOB KING.

Witnesses:
P. P. BARNHILL,
ROBERT T. WILLIAMS.